(12) United States Patent
Yasuda et al.

(10) Patent No.: US 11,745,745 B2
(45) Date of Patent: Sep. 5, 2023

(54) SYSTEMS AND METHODS FOR IMPROVING DRIVER ATTENTION AWARENESS

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 235 days.

(21) Appl. No.: 17/318,474

(22) Filed: May 12, 2021

(65) Prior Publication Data
US 2022/0363266 A1  Nov. 17, 2022

(51) Int. Cl.
*B60W 40/09* (2012.01)
*B60W 50/14* (2020.01)
*B60W 40/04* (2006.01)

(52) U.S. Cl.
CPC ............ *B60W 40/09* (2013.01); *B60W 40/04* (2013.01); *B60W 50/14* (2013.01); *B60W 2050/146* (2013.01); *B60W 2540/229* (2020.02); *B60W 2552/00* (2020.02); *B60W 2554/40* (2020.02)

(58) Field of Classification Search
CPC ...... B60W 40/09; B60W 40/04; B60W 50/14; B60W 2050/146; B60W 2540/229; B60W 2552/00; B60W 2554/40
See application file for complete search history.

(56) References Cited

U.S. PATENT DOCUMENTS

| | | | |
|---|---|---|---|
| 2002/0120371 A1* | 8/2002 | Leivian | G07C 5/0816 701/1 |
| 2011/0111724 A1 | 5/2011 | Baptiste | |
| 2016/0267335 A1* | 9/2016 | Hampiholi | B60K 28/06 |
| 2017/0127255 A1 | 5/2017 | Archer et al. | |
| 2018/0176885 A1* | 6/2018 | VanBlon | H04W 4/02 |

(Continued)

FOREIGN PATENT DOCUMENTS

EP  3067827 A1  9/2016

OTHER PUBLICATIONS

Garcia-Constantino et a., "Measuring the Impact of Cognitive Distractions on Driving Performance Using Time Series Analysis," arXiv:1408.5573v1, Aug. 24, 2014, found at https://arxiv.org/pdf/1408.5573.pdf.

(Continued)

*Primary Examiner* — Peter D Nolan
*Assistant Examiner* — Tanya C Sienko
(74) *Attorney, Agent, or Firm* — Christopher G. Darrow; DARROW MUSTAFA PC

(57) ABSTRACT

Systems and methods for improving driver attention awareness are disclosed herein. One embodiment monitors the attention status of the driver of a vehicle; detects, based on the monitoring, the commencement of a distracted-driving incident; records, during the distracted-driving incident, information pertaining to the distracted-driving incident; detects, based on the monitoring, the end of the distracted-driving incident; and reports, at the earliest opportunity after the end of the distracted-driving incident and prior to the conclusion of the current trip, the information to the driver.

20 Claims, 5 Drawing Sheets

(56) References Cited

U.S. PATENT DOCUMENTS

| | | | | |
|---|---|---|---|---|
| 2019/0147266 A1* | 5/2019 | Aizawa | ................. | B60K 37/06 |
| | | | | 340/576 |
| 2019/0147275 A1* | 5/2019 | Matsuura | .............. | B60W 50/14 |
| | | | | 348/148 |
| 2021/0394775 A1* | 12/2021 | Julian | .................... | G08G 1/164 |

OTHER PUBLICATIONS

Merrikhpour et al., "Designing Feedback to Mitigate Teen Distracted Driving: A Social Norms Approach," Accident Analysis and Prevention 104 (2017), Elsevier, pp. 185-194, abstract linked at https://www.sciencedirect.com/science/article/abs/pii/S0001457517301458.

Solomon, "Driver Attention and Behavior Monitoring with the Microsoft Kinect Sensor," Master's Thesis, Nov. 2015, found at https://core.ac.uk/download/pdf/79170976.pdf.

Distracted Driving, United States Department of Transportation Web page, found at https://www.nhtsa.gov/risky-driving/distracted-driving (accessed on Feb. 23, 2021).

* cited by examiner

SYSTEMS AND METHODS FOR IMPROVING DRIVER ATTENTION AWARENESS

TECHNICAL FIELD

The subject matter described herein generally relates to vehicles and, more particularly, to systems and methods for improving driver attention awareness.

BACKGROUND

Distracted driving is a serious problem that reportedly claimed 2,841 lives in the U.S. in 2018 alone. Those killed included 1,730 drivers, 605 passengers, 400 pedestrians, and 77 bicyclists. Texting is one of the more common distractions. At 55 mph, sending or reading a text that takes the driver's eyes off the road for five seconds is like the driver driving the length of an entire football field with his or her eyes closed. Some conventional systems for mitigating distracted driving detect that the driver is distracted and immediately warn the driver to pay attention to the road. Such abrupt warnings can themselves be distracting, even startling, to drivers. Consequently, some drivers may resist such automated assistance and may even ignore or disable the feature.

SUMMARY

An example of a system for improving driver attention awareness is presented herein. The system comprises one or more processors and a memory communicably coupled to the one or more processors. The memory stores a driver monitoring module including instructions that when executed by the one or more processors cause the one or more processors to monitor the attention status of the driver of a vehicle. The memory also stores a distracted-driving module including instructions that when executed by the one or more processors cause the one or more processors to detect, based on the monitored attention status of the driver, the commencement of a distracted-driving incident. The distracted-driving module also includes instructions that when executed by the one or more processors cause the one or more processors to record, during the distracted-driving incident, information pertaining to the distracted-driving incident. The distracted-driving module also includes instructions that when executed by the one or more processors cause the one or more processors to detect, based on the monitored attention status of the driver, the end of the distracted-driving incident. The memory also stores a notification module including instructions that when executed by the one or more processors cause the one or more processors to report, at the earliest opportunity after the end of the distracted-driving incident and prior to the conclusion of the current trip, the information to the driver.

Another embodiment is a non-transitory computer-readable medium for improving driver attention awareness and storing instructions that when executed by one or more processors cause the one or more processors to monitor the attention status of the driver of a vehicle. The instructions also cause the one or more processors to detect, based on the monitored attention status of the driver, the commencement of a distracted-driving incident. The instructions also cause the one or more processors to record, during the distracted-driving incident, information pertaining to the distracted-driving incident. The instructions also cause the one or more processors to detect, based on the monitored attention status of the driver, the end of the distracted-driving incident. The instructions also cause the one or more processors to report, at the earliest opportunity after the end of the distracted-driving incident and prior to the conclusion of the current trip, the information to the driver.

In another embodiment, a method of improving driver attention awareness is disclosed. The method comprises monitoring the attention status of the driver of a vehicle. The method also includes detecting, based on the monitoring, the commencement of a distracted-driving incident. The method also includes recording, during the distracted-driving incident, information pertaining to the distracted-driving incident. The method also includes detecting, based on the monitoring, the end of the distracted-driving incident. The method also includes reporting, at the earliest opportunity after the end of the distracted-driving incident and prior to the conclusion of the current trip, the information to the driver.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
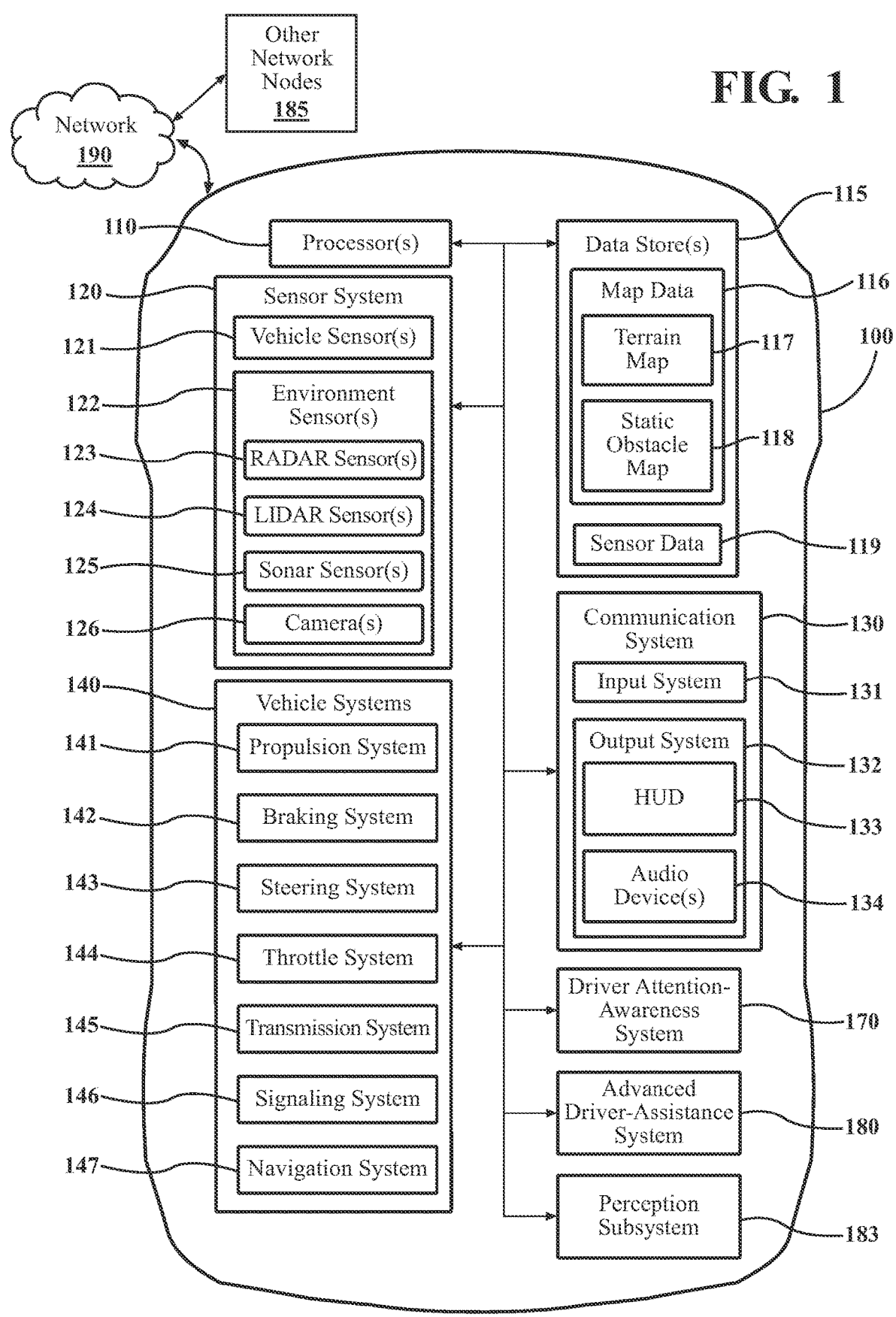
FIG. 1 illustrates one embodiment of a vehicle within which systems and methods disclosed herein may be implemented.

Various embodiments of a driver attention-awareness system described herein reduce or eliminate distracted-driving behavior over time by educating and informing the driver regarding distracted-driving incidents in a timely fashion (i.e., as soon as possible after they occur) and in a manner that distracts or startles the driver as little as possible. This approach increases the likelihood that a driver will accept assistance with distracted driving, and accepting such assistance increases the likelihood that the driver's distracted-driving behavior will be reduced or even eliminated, over time.

One fundamental difference between the approach taken in these various embodiments and that of conventional distracted-driving mitigation systems is the timing of notifying the driver regarding a given distracted-driving incident. Some conventional systems immediately warn the driver via visual and/or audible cues, if the system detects that the driver has become distracted. The objective of such systems is to minimize distracted driving by taking immediate corrective action upon detecting that the driver is distracted—to "nip it in the bud," so to speak. Such an aggressive approach can be distracting—even startling—to a driver, reducing the driver's acceptance of the feature. Other conventional systems provide a report of distracted-driving incidents after the drive/trip is concluded. By that time, the driver may have forgotten the specifics of a particular instance of distraction (e.g., how and why the distraction came about). Also, if the driver is in a hurry to exit the vehicle, he or she might be unwilling to take the time to review the distracted-driving report. The various embodiments described herein overcome the above drawbacks of conventional distracted-driving mitigation systems.

In various embodiments, a driver attention-awareness system monitors the attention status of the driver of a vehicle. The system can do this, for example, by analyzing images from a camera in the passenger compartment to ascertain where the driver's attention is directed at a given point in time. This monitoring of the driver's attention status is performed throughout a drive or trip to support the other operations described below.

When the system determines that the driver's attention is directed somewhere other than where it should be, given the current traffic situation the system perceives, the system detects the commencement of a distracted-driving incident. During the distracted-driving incident, the system records information pertaining to the distracted-driving incident. For example, the system can record the duration of the distracted-driving incident, the distance the vehicle traveled during the distracted-driving incident, and information regarding a variety of different types of conditions and/or objects in the environment external to the vehicle that the driver missed or overlooked, while distracted. Sometime (e.g., a few seconds) later, the system detects the end of the distracted-driving incident. That is, the system detects that the driver is no longer distracted.

Once the system has determined that the distracted-driving incident has ended, the system, at the earliest opportunity prior to the conclusion of the current drive or trip, reports to the driver the recorded information pertaining to the latest distracted-driving incident. If the currently perceived traffic situation does not require an unusual degree of attention and concentration by the driver, the information pertaining to the distracted-driving incident is reported to the driver immediately after the distracted-driving incident ends. If the system perceives that a complex or potentially hazardous traffic condition exists when the distracted-driving incident ends, the system waits until that perceived traffic situation has been resolved and then reports the information to the driver.

The reporting is done in a manner that minimally distracts the driver but can differ, depending on the embodiment. For example, in one embodiment, the system displays the information on a head-up display (HUD) of the vehicle, enabling the driver to see the distracted-driving report without having to take his or her eyes off the road. In another embodiment, the system displays the information on the instrument cluster of the vehicle behind the steering wheel. In yet another embodiment, the system communicates the information to the driver via an audible message. In some embodiments, sounds of various kinds (e.g., beeps or tones) can be used in combination with the visual-display methods just described.

Referring to FIG. 1, an example of a vehicle 100, in which systems and methods disclosed herein can be implemented, is illustrated. The vehicle 100 can include a driver attention-awareness system 170 or components and/or modules thereof. As used herein, a "vehicle" is any form of motorized transport. In one or more implementations, the vehicle 100 can be an automobile. In some implementations, the vehicle 100 may be any other form of motorized transport. The vehicle 100 can include the driver attention-awareness system 170 or capabilities to support or interact with the driver attention-awareness system 170 and thus benefits from the functionality discussed herein. While arrangements will be described herein with respect to automobiles, it will be understood that implementations are not limited to automobiles. Instead, implementations of the principles discussed herein can be applied to any kind of vehicle. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including driver attention-awareness system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 185 via a network 190. Such other network nodes 185 can include, for example, cloud servers, edge servers, roadside units (RSUs) or other infrastructure (e.g., traffic signals at intersections), users' mobile devices, and/or other connected vehicles. For example, vehicle 100 may receive traffic information from one or more cloud or edge servers. In communicating with servers, vehicle 100 can use a technology such as cellular data. In communicating with other vehicles, vehicle 100 can use a technology such as Dedicated Short-Range Communications (DSRC) or Bluetooth Low Energy (Bluetooth LE).

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Vehicle 100 includes a sensor system 120. Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include vehicle-bus sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. The environment sensors 122 can be used, for example, to detect and recognize objects (e.g., other vehicles, pedestrians, cyclists, children, animals, traffic signs, obstacles, construction equipment, etc.) in the environment external to vehicle 100. In some embodiments, environment sensors 122 support the functions of an Advanced Driver-Assistance System (ADAS) 180. Environment sensors 122 also include sensors pertaining to the interior of vehicle 100. For example, driver attention-awareness system 170 uses one or more cameras 126 in the passenger compartment and, in some embodiments, other sensors to monitor the attention status of the driver of vehicle 100.

Vehicle 100 also includes a communication system 130. Communication system 130 includes an input system 131, and output system 132, and audio device(s) 134. Output system 132 can include one or more display devices. For example, output system 132 may include a center-console touchscreen display. In the various embodiments discussed herein, output system 132 includes a HUD 133. Output system 132 may include other display devices (not shown in FIG. 1) in addition to HUD 133. For example, in some embodiments, output system 132 may include a display in the instrument cluster behind the steering wheel for displaying, among other things, reports of distracted-driving incidents detected by driver attention-awareness system 170.

As mentioned above, vehicle 100 includes an ADAS 180. ADAS 180 can use information obtained via sensor system 120, map data 116, and other sources (e.g., a traffic-information server or another connected vehicle) to predict or detect potentially hazardous traffic situations and to assist the driver of vehicle 100 in avoiding accidents. In some embodiments, ADAS 180 issues warnings or alerts so the driver can take corrective action. In other embodiments, ADAS 180 temporarily intervenes in the steering and/or acceleration of vehicle, when necessary, 100 to avoid an accident. For example, in some embodiments, ADAS 180 can detect that vehicle 100 is too close to a preceding (lead) vehicle in the same lane and issue a forward-collision warning and/or actively intervene by braking automatically to prevent vehicle 100 from rear-ending the preceding vehicle. Similar warnings and/or active interventions can apply to, for example, lane departure and potentially hazardous cross-traffic at an intersection. As discussed further below, in some embodiments, the perceptual capabilities of ADAS 180 to analyze the environment external to vehicle 100 and to identify potentially hazardous traffic situations are leveraged to support driver attention-awareness system 170. For example, ADAS 180 can assist driver attention-awareness system 170 in determining where a driver's attention should be focused at a given time. In some embodiments, vehicle 100 includes a perception subsystem 183 instead of or in addition to ADAS 180. In some implementations, ADAS 180 is one aspect of perception subsystem 183. Perception subsystem 183 is discussed further below.

Figure 2:
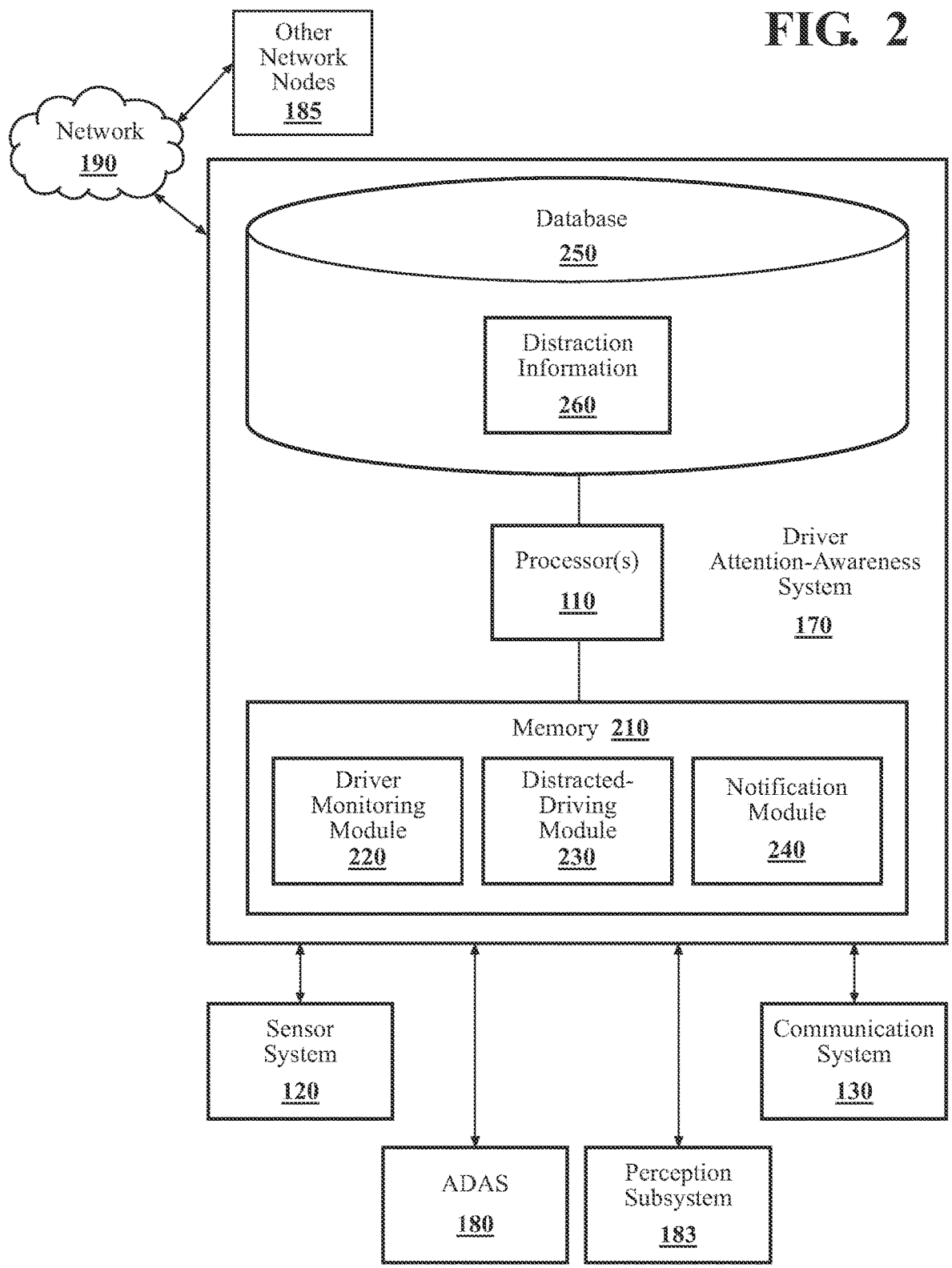
FIG. 2 is a functional block diagram of an embodiment of a driver attention-awareness system.

Referring to FIG. 2, one embodiment of the driver attention-awareness system 170 of FIG. 1 is further illustrated. In this embodiment, driver attention-awareness system 170 is shown as including one or more processors 110 from the vehicle 100 of FIG. 1. In general, the one or more processors 110 may be a part of driver attention-awareness system 170, driver attention-awareness system 170 may include one or more separate processors from the one or more processors 110 of the vehicle 100, or driver attention-awareness system 170 may access the one or more processors 110 through a data bus or another communication path, depending on the embodiment.

In one embodiment, memory 210 stores a driver monitoring module 220, a distracted-driving module 230, and a notification module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that, when executed by the one or more processors 110, cause the one or more processors 110 to perform the various functions disclosed herein.

As shown in FIG. 2, driver attention-awareness system 170 interfaces with sensor system 120, communication system 130 (which includes HUD 133 and/or other displays and audio device(s) 134), ADAS 180, and perception subsystem 183 (refer to FIG. 1). In some embodiments, driver attention-awareness system 170 can also communicate with other network nodes 185 (e.g., cloud servers, edge servers, RSUs or other infrastructure systems, users' mobile devices, and/or other connected vehicles) via network 190, as discussed above in connection with FIG. 1.

Driver attention-awareness system 170 can store data such as distraction information 260 in a database 250. Distraction information 260 is discussed in further detail below.

Perception subsystem 183 processes sensor data 119 from sensor system 120 and, in some embodiments, information from external sources (e.g., a traffic information server) to "understand," "comprehend," or "interpret," in real time, the traffic situations in which vehicle 100 participates under the control of the human driver. Perception subsystem 183 performs tasks such as object detection, object recognition, object tracking, object trajectory prediction, and localization.

In the context of driver attention-awareness system 170, some of the most relevant information that perception subsystem 183 outputs is one or more locations in the environment external to vehicle 100 to which the driver's attention should be directed ("points of attention"), based on an analysis of the current traffic situation. Perception subsystem 183 updates this analysis in real time as vehicle 100 and other objects in the environment move around. In some embodiments, perception subsystem 183 ranks the points of attention in descending order of priority. At the very least, perception subsystem 183 identifies the most important location or object (the primary point of attention) to which the driver should direct his or her attention at any given time. For example, if vehicle 100 is proceeding straight on a city street and another vehicle coming the opposite direction makes a left turn in front of vehicle 100 (one that requires the driver of vehicle 100 to brake somewhat to avoid a collision), perception subsystem 183 identifies the vehicle making the left turn in front of vehicle 100 as the primary point of attention. Similarly, if perception subsystem 183 identifies a pedestrian entering a crosswalk in front of vehicle 100, perception subsystem 183 determines that the pedestrian is the primary point of attention.

In some embodiments, ADAS 180 performs at least some of the perceptual functions described above in connection with perception subsystem 183. As mentioned above, in some embodiments, vehicle 100 includes both ADAS 180 and perception subsystem 183. In other embodiments, ADAS 180 is one aspect of a broader perception subsystem 183. In still other embodiments, vehicle 100 includes only ADAS 180, but ADAS 180 performs the perceptual functions that support driver attention-awareness system 170 (e.g., identifying and outputting the one or more context-based points of attention discussed above).

As those skilled in the art are aware, ADAS 180 and perception subsystem 183 can employ a variety of techniques to perceive ("understand") traffic situations. Such techniques include, without limitation, semantic segmentation, instance segmentation, and any of a variety of machine-learning-based and non-machine-learning-based object-recognition and trajectory-prediction algorithms.

Driver monitoring module 220 generally includes instructions that when executed by the one or more processors 110 cause the one or more processors 110 to monitor the attention status of the driver of a vehicle 100. Depending on the embodiment, driver monitoring module 220 can employ several different attention-monitoring techniques individually or in combination to monitor the attention status of the driver. Examples include (1) gaze detection/tracking (i.e., detecting in which direction the driver is looking); (2) face orientation detection (i.e., determining the direction in which the driver's face is pointing); (3) detecting that the driver is interacting with a mobile device, such as a smartphone, or some other object in his or her hand(s) (e.g., food item, purse, etc.); and (4) detecting input to vehicle user interfaces (UIs) for infotainment, HVAC, etc.

As those skilled in the art are aware, driver monitoring module 220 can perform the first three techniques mentioned above by analyzing images output by a camera 126 aimed toward the driver inside the passenger compartment of vehicle 100. For example, gaze detection can include identifying in which direction the driver's pupils or irises are pointed, and face orientation detection can include identifying the driver's nose and determining in which direction the driver's nose is pointed. Regarding the fourth technique (UI-input detection), in some embodiments, an interior camera 126 is used to identify which occupant in vehicle 100 actuated a user-interface control. Since only UI input from the driver is relevant to monitoring the driver's attention status, driver monitoring module 220 disregards input from another vehicle occupant (e.g., a front-seat passenger), in those embodiments.

As discussed above, driver monitoring module 220 monitors the attention status of the driver in real time throughout a drive/trip. This permits distracted-driving module 230 (discussed further below) to detect when a given instance of distracted driving (a "distracted-driving incident") begins and ends. Knowing when a given distracted-driving incident begins and ends is relevant to other operations carried out by driver attention-awareness system 170, as explained further below.

Using some or all of the four attention-monitoring techniques discussed above, driver monitoring module 220 compares where the driver's attention should be, as determined by perception subsystem 183 and/or ADAS 180, with where the driver's attention actually is. If they match, the driver's attention status is deemed to be "attentive." If, on the other hand, they do not match (e.g., a pedestrian has just stepped into a crosswalk at the intersection ahead, but the driver is looking out the driver-side window at a storefront), the driver's attention status is deemed to be "distracted." Driver monitoring module 220 updates the attention status of the driver frequently (e.g., several times a second, in some embodiments) throughout a drive/trip. Note that if the driver is backing up vehicle 100 (i.e., vehicle 100 is in reverse), the driver should be looking backward, not forward. Driver monitoring module 220 is designed to handle cases like this and would not label a driver looking backward, in such a situation, as being "distracted." Also, there are numerous situations in which the driver should be looking out through a side window rather than the windshield. Where the driver should be looking is, thus, context-dependent, and driver monitoring module 220 is designed accordingly.

Distracted-driving module 230 generally includes instructions that when executed by the one or more processors 110 cause the one or more processors 110 to detect, based on the monitored attention status of the driver obtained from driver monitoring module 220, the commencement of a distracted-driving incident. In some embodiments, distracted-driving module 230 does not declare a distracted-driving incident to have begun until the driver's monitored attention status of "distracted" has exceeded a distraction-duration threshold (e.g., 2 seconds, in one embodiment). In another embodiment, a distance-traveled threshold is instead applied. That is, distracted-driving module 230 does not consider a distracted-driving incident to have begun until vehicle 100 has traveled more than a threshold distance (e.g., 25 m) while the driver's monitored attention status remains "distracted." In still other embodiments, distraction-duration and a distance-traveled thresholds can be used in combination (e.g., whichever threshold is exceeded first triggers the beginning of a distracted-driving incident). In other words, in some embodiments, distracted-driving module 230 conditions the commencement of the distracted-driving incident upon at least one of a distraction-duration threshold and a distance-traveled threshold being exceeded.

A distance-traveled threshold is particularly useful because it inherently accounts for the speed at which vehicle 100 is traveling, unlike a distraction-duration threshold. Other factors such as road topology aside, the driver being distracted at 70 mph is generally riskier (a greater likelihood of negative consequences) than the driver being distracted at 25 mph because the vehicle travels much farther per unit time in the first instance than in the second. Conditioning the beginning of a distracted-driving incident on a distance-traveled threshold accounts for this speed-dependent risk. In general, the reason for imposing a distraction-duration and/or distance-traveled threshold is to exclude momentary—and, therefore, inconsequential—instances of distraction (e.g., the driver looks over at a control for the sound system as he or she reaches for it or glances at a front-seat passenger with whom the driver is speaking and then immediately returns his or her attention to the roadway ahead).

In some embodiments, distracted-driving module 230 obtains, via perception subsystem 183 and/or ADAS 180, an estimate of the level of risk associated with a current traffic situation, from the perspective of vehicle 100. In these embodiments, distracted-driving module 230 varies the distraction-duration and/or distance-traveled threshold depending on the estimated level of risk. For example, in a high-risk traffic situation, distracted-driving module 230 can shorten (reduce) the threshold(s) somewhat. In a low-risk traffic situation, distracted-driving module 230 can lengthen (increase) the threshold(s) somewhat. In some embodiments, a user/driver is permitted to adjust the threshold(s), to a certain extent. For example, in one embodiment, the user can reduce the threshold(s) to obtain more feedback from driver attention-awareness system 170 but is not permitted to increase the threshold(s) to make the system less sensitive (i.e., to provide less information). In other embodiments, the user can set the threshold(s) where desired—at least within a predetermined range.

Distracted-driving module 230 also includes instructions that when executed by the one or more processors 110 cause the one or more processors 110 to record, during the distracted-driving incident, information pertaining to the distracted-driving incident. Recall that one of the objectives of driver attention-awareness system 170 is to educate and inform the driver regarding his or her attention habits while driving—specifically, to increase the driver's awareness of his or her attention habits so the driver can choose to improve them. Consequently, the distraction information 260 that distracted-driving module 230 records during a distracted-driving incident reflects that objective.

During a distracted-driving incident, distracted-driving module 230 receives perceptual information from perception subsystem 183 and/or ADAS 180 regarding objects and other conditions detected in the external environment and uses that information in recording (storing) distraction information 260. Examples of distraction information 260 include the duration of the distracted-driving incident (once it is known), the distance traveled by vehicle 100 during the distracted-driving incident (once it is known), overlooked other road users (vehicles, motorcyclists, bicyclists, pedestrians, and children), overlooked animals (e.g., pets, wild animals such as deer, etc.), overlooked traffic signals (e.g., traffic lights at an intersection), overlooked traffic signs (e.g., stop signs, speed-limit signs, etc.), overlooked emergency vehicles (e.g., firetrucks, ambulances, police cars), and overlooked location-related contexts. In this context, "overlooked" means "missed" or "unnoticed." That is, the "overlooked" objects and conditions are those to which the driver fails to pay attention while he or she is distracted. Making the driver aware of these overlooked or missed objects and conditions can help the driver to understand the potential gravity of being distracted while driving vehicle 100 without directly "admonishing" or "teaching" the driver to be more attentive. This "soft-touch" approach increases the likelihood that the driver will accept the assistance that driver attention-awareness system 170 provides.

Herein, an "overlooked location-related context" refers to a particular location or environment that could have a bearing on safety, in at least some situations. Examples include, without limitation, a construction zone, a school zone, a school crossing, a crosswalk, an event venue (e.g., a stadium or concert hall), and a hospital zone.

Distracted-driving module 230 also includes instructions that when executed by the one or more processors 110 cause the one or more processors 110 to detect, based on the monitored attention status of the driver obtained from driver monitoring module 220, the end of the distracted-driving incident. When distracted-driving module 230 determines that a distracted-driving incident has begun, as discussed above, distracted-driving module 230 continues to check the current attention status of the driver provided by driver monitoring module 220 to detect when that distracted-driving incident has ended (i.e., when the driver is once again "attentive" instead of "distracted"). Once a distracted-driving incident has ended, notification module 240 (described below) comes into play.

Notification module 240 generally includes instructions that when executed by the one or more processors 110 cause the one or more processors 110 to report to the driver, at the earliest opportunity after the end of the distracted-driving incident and prior to the conclusion of the current trip, the distraction information 260 discussed above. As discussed above, notification module 240 reports the distraction information 260 to the driver in a manner that is intended to minimally distract the driver. In some embodiments, notification module 240 displays the distraction information 260 on HUD 133. In some embodiments, HUD 133 is a type that projects information onto at least a portion of the windshield. In other embodiments, notification module 240 displays the distraction information 260 somewhere on the instrument cluster behind the steering wheel of vehicle 100. In still other embodiments, notification module 240 communicates the distraction information 260 to the driver via an audible message. As also mentioned above, audible sounds (e.g., beeps or tones) can, in some embodiments, be used in conjunction with displayed distraction information 260. Examples of distraction information 260 being displayed on HUD 133 are illustrated in FIGS. 3 and 4.

Figure 3:
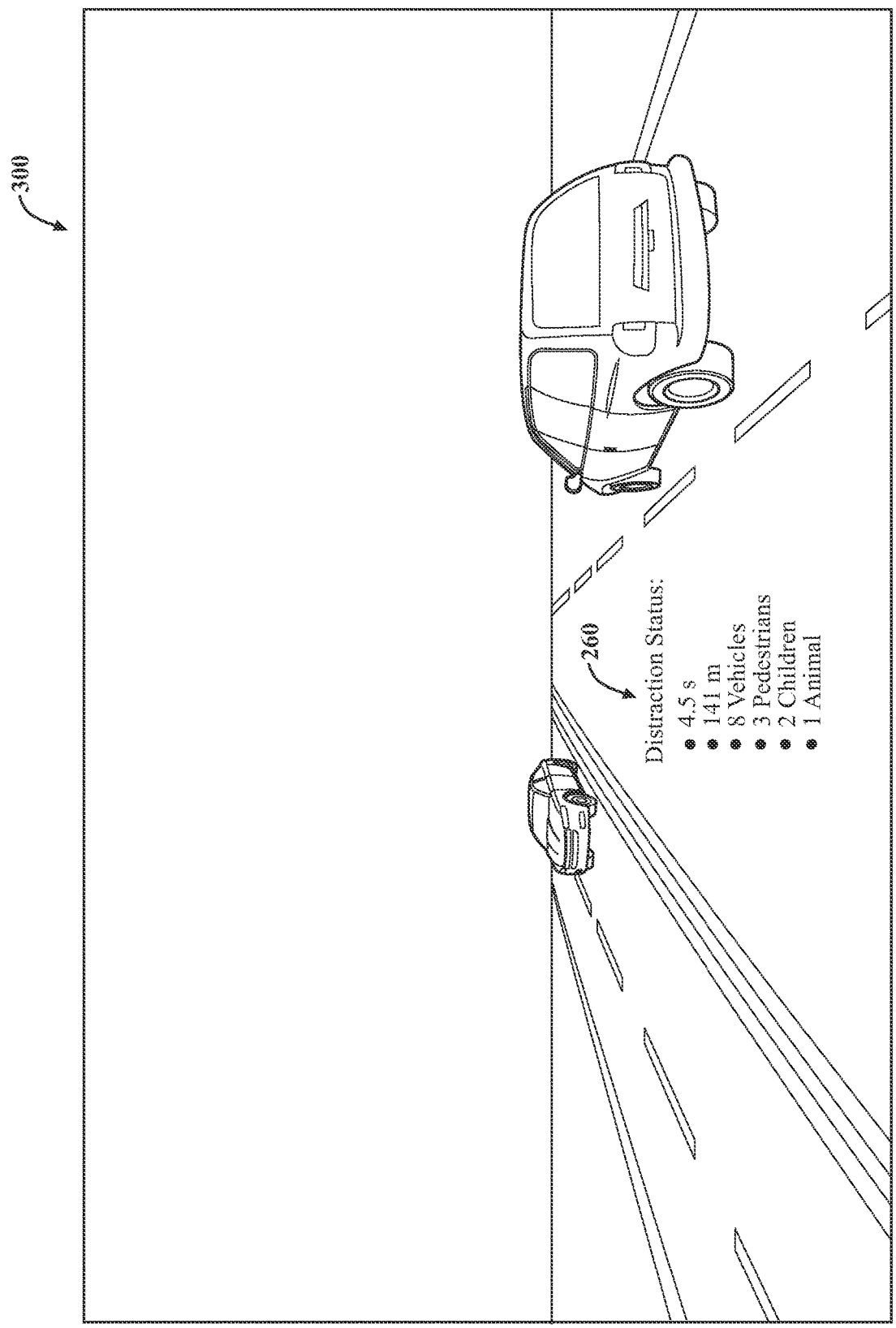
FIG. 3 illustrates a view from a driver's perspective, in accordance with an illustrative embodiment of the invention.

FIG. 3 illustrates a view 300 from a driver's perspective in vehicle 100, in accordance with an illustrative embodiment of the invention. In the example of FIG. 3, distracted-driving module 230 has determined that the driver's latest distracted-driving incident has ended, and notification module 240 has displayed distraction information 260 that includes, as shown, the duration of the distracted-driving incident (4.5 s), the distance vehicle 100 traveled during the distracted-driving incident (141 m), the number of overlooked vehicles (8), the number of overlooked pedestrians (3), the number of overlooked children (2), and the number of overlooked animals (1).

Figure 4:
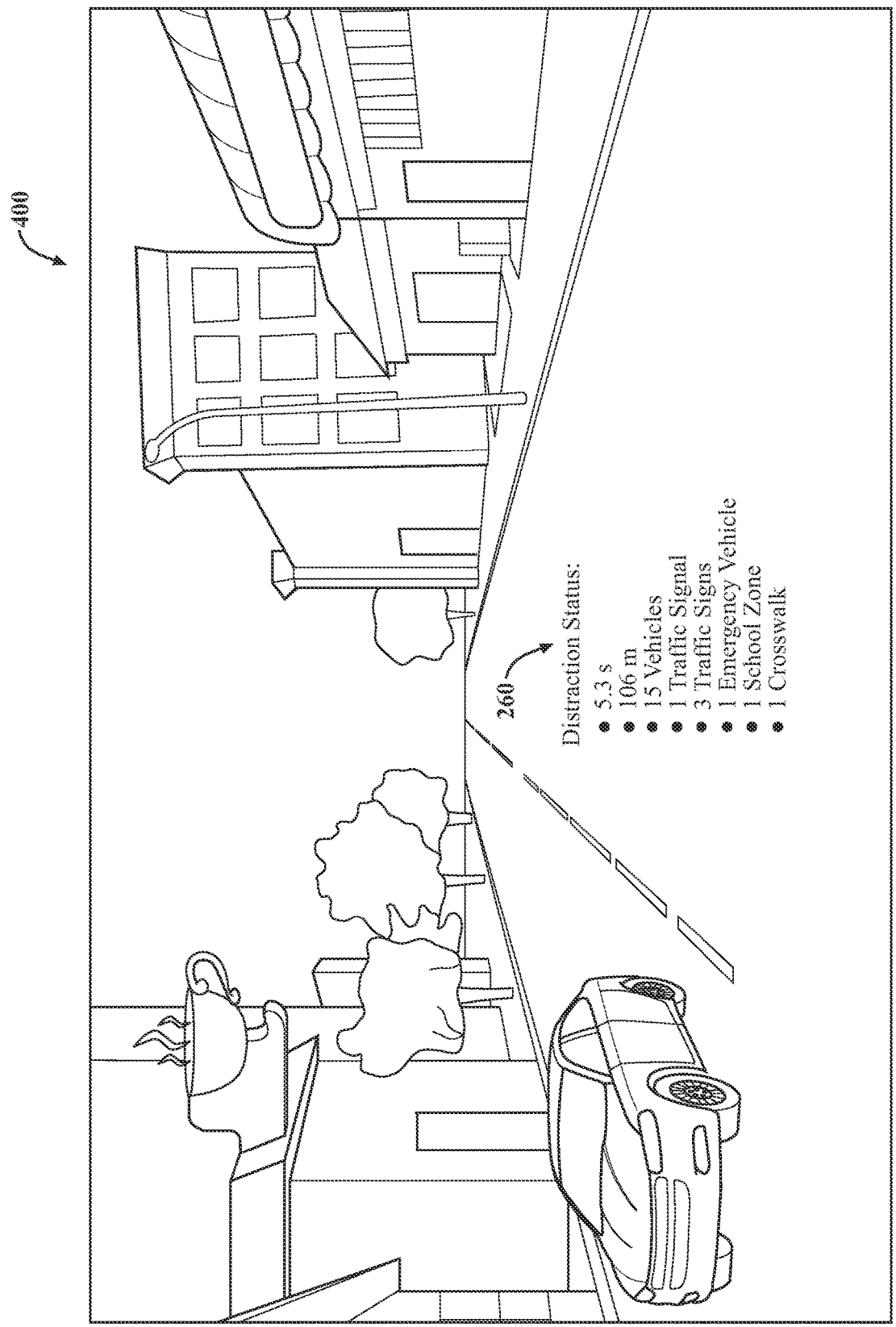
FIG. 4 illustrates another view from a driver's perspective, in accordance with another illustrative embodiment of the invention.

FIG. 4 illustrates another view 400 from a driver's perspective in vehicle 100, in accordance with another illustrative embodiment of the invention. In the example of FIG. 4, distracted-driving module 230 has determined that the driver's latest distracted-driving incident has ended, and notification module 240 has displayed distraction information 260 that includes, as shown, the duration of the distracted-driving incident (5.3 s), the distance vehicle 100 traveled during the distracted-driving incident (106 m), the number of overlooked vehicles (15), the number of overlooked traffic signals (1), the number of overlooked traffic signs (3), the number of overlooked emergency vehicles (1), the number of overlooked school zones (1), and the number of overlooked crosswalks (1).

Notification module 240 reporting the distraction information 260 to the driver "at the earliest opportunity" can mean different things, depending on the embodiment. That is, when that point in time occurs depends on the nature of the current traffic situation driver attention-awareness system 170 perceives. In one embodiment, notification module 240 reports the distraction information 260 to the driver immediately (or within a few seconds) after the end of the latest distracted-driving incident. In a different embodiment, notification module 240 detects, based on information received from perception subsystem 183 and/or ADAS 180, that there is a traffic situation requiring the driver's full attention. In such a situation, notification module 240 waits until the detected traffic situation has been resolved and then immediately (or within a few seconds) reports the distraction information 260 to the driver.

Once notification module 240 has caused the distraction information 260 to be displayed to the driver, how long that information persists on the display varies, depending on the embodiment. In one embodiment, the distraction information 260 persists on the display until the next distracted-driving incident has concluded, and the display is updated to reflect the latest distracted-driving incident. In other embodiments, the driver can acknowledge the report with the press of a button, icon, or other UI element, which dismisses the report. In yet another embodiment, the distraction information 260 persists on the display until notification module 240 has determined, through a technique such as gaze detection, that the driver has looked at the report long enough to have read it. In yet another embodiment, the report of the distraction information 260 persists on the display for a predetermined period before automatically being removed from the display. In this latter embodiment, how long the distraction information 260 persists on the display can depend on how much information the report contains. For example, a longer report may persist for a longer period than a shorter report.

Figure 5:
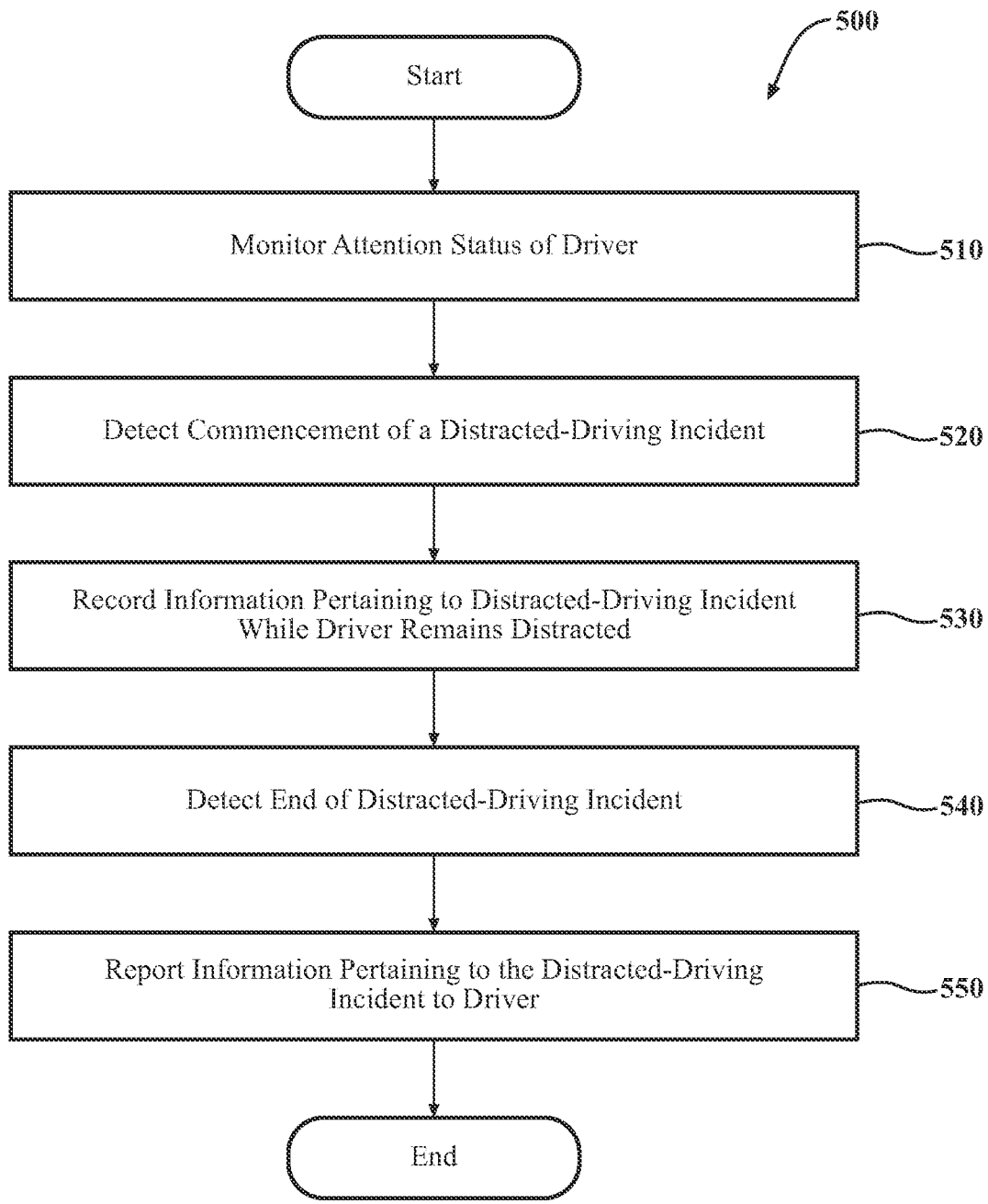
FIG. 5 is a flowchart of a method of improving driver attention awareness, in accordance with an illustrative embodiment of the invention.

FIG. 5 is a flowchart of a method 500 of improving driver attention awareness, in accordance with an illustrative embodiment of the invention. Method 500 will be discussed from the perspective of driver attention-awareness system 170 in FIG. 2. While method 500 is discussed in combination with driver attention-awareness system 170, it should be appreciated that method 500 is not limited to being implemented within driver attention-awareness system 170, but driver attention-awareness system 170 is instead one example of a system that may implement method 500.

At block 510, driver monitoring module 220 monitors the attention status of the driver of a vehicle 100. As discussed above, driver monitoring module 220 can employ techniques such as (1) gaze detection/tracking; (2) face orientation detection; (3) detecting that the driver is interacting with a mobile device, such as a smartphone, or some other object in his or her hand(s); and (4) detecting input to vehicle UIs for infotainment, HVAC, etc. As also discussed above, driver monitoring module 220 can perform the first three techniques listed above by analyzing images output by a camera 126 aimed toward the driver inside the passenger compartment of vehicle 100. Regarding the fourth technique (UI-input detection), in some embodiments, an interior camera 126 is used to identify which occupant in vehicle 100 actuated a user-interface control. Since only UI input from the driver is relevant to monitoring the driver's attention status, driver monitoring module 220 disregards input from another vehicle occupant (e.g., a front-seat passenger), in those embodiments.

As discussed above, using some or all of the four attention-monitoring techniques discussed above, driver monitoring module 220 compares where the driver's attention should be, as determined by perception subsystem 183 and/or ADAS 180, with where the driver's attention actually is. If they match, the driver's attention status is deemed to be "attentive." If, on the other hand, they do not match (e.g., a pedestrian has just stepped into a crosswalk at the intersection ahead, but the driver is looking out the driver-side window at a storefront), the driver's attention status is deemed to be "distracted." Driver monitoring module 220 updates the attention status of the driver frequently (e.g., several times a second, in some embodiments) throughout a drive/trip.

At block 520, distracted-driving module 230 detects, based on the monitored attention status of the driver provided by driver monitoring module 220, the commencement of a distracted-driving incident. As discussed above, in some embodiments, distracted-driving module 230 does not declare a distracted-driving incident to have begun until the driver's monitored attention status of "distracted" has exceeded one or more of a distraction-duration threshold and a distance-traveled threshold. As also discussed above, in some embodiments, distracted-driving module 230 obtains, via perception subsystem 183 and/or ADAS 180, an estimate of the level of risk associated with a current traffic situation, from the perspective of vehicle 100. In these embodiments, distracted-driving module 230 varies the distraction-duration and/or distance-traveled threshold depending on the estimated level of risk. For example, in a high-risk traffic situation, distracted-driving module 230 can shorten (reduce) the threshold(s) somewhat. In a low-risk traffic situation, distracted-driving module 230 can lengthen (increase) the threshold(s) somewhat. Thus, in such an embodiment, the distraction-duration threshold, the distance-traveled threshold, or both vary depending on the estimated level of risk. As also discussed above, in some embodiments, a driver/user is permitted to adjust the threshold(s), to at least some extent.

At block 530, distracted-driving module 230 records, during the distracted-driving incident, information (260) pertaining to the distracted-driving incident. As discussed above, examples of distraction information 260 include the duration of the distracted-driving incident, the distance traveled by vehicle 100 during the distracted-driving incident, overlooked other road users (vehicles, motorcyclists, bicyclists, pedestrians, and children), overlooked animals (e.g., pets, wild animals such as deer, etc.), overlooked traffic signals (e.g., traffic lights at an intersection), overlooked traffic signs (e.g., stop signs, speed-limit signs, etc.), overlooked emergency vehicles (e.g., firetrucks, ambulances, police cars), and overlooked location-related contexts. An "overlooked location-related context" refers to a particular location or environment that could have a bearing on safety, in at least some situations. Examples include, without limitation, a construction zone, a school zone, a school crossing, a crosswalk, an event venue (e.g., a stadium or concert hall), and a hospital zone.

At block 540, distracted-driving module 230 detects, based on the monitored attention status of the driver, the end of the distracted-driving incident. As discussed above, when distracted-driving module 230 determines that a distracted-driving incident has begun, as discussed above, distracted-driving module 230 continues to check the current attention status of the driver provided by driver monitoring module 220 to detect when that distracted-driving incident has ended (i.e., when the driver is once again "attentive" instead of "distracted").

At block 550, notification module 240 reports, at the earliest opportunity after the end of the distracted-driving incident and prior to the conclusion of the current trip, the information (260) to the driver of vehicle 100. As discussed above, notification module 240 reports the distraction information 260 to the driver in a manner that is intended to minimally distract the driver. In some embodiments, notification module 240 displays the distraction information 260 on HUD 133. In other embodiments, notification module 240 displays the distraction information 260 somewhere on the instrument cluster behind the steering wheel of vehicle 100. In still other embodiments, notification module 240 communicates the distraction information 260 to the driver via an audible message. As also mentioned above, audible sounds (e.g., beeps or tones) can, in some embodiments, be used in conjunction with the displayed distraction information 260.

In some embodiments, method 500 also includes additional actions not shown in FIG. 5. For example, as discussed above, notification module 240 reporting the distraction information 260 to the driver "at the earliest opportunity" can mean different things, depending on the embodiment. In one embodiment, notification module 240 reports the distraction information 260 to the driver immediately (or within a few seconds) after the end of the latest distracted-driving incident. In a different embodiment, notification module 240 detects, based on information received from perception subsystem 183 and/or ADAS 180, that there is a traffic situation requiring the driver's full attention. In such a situation, notification module 240 waits until the detected traffic situation has been resolved and then immediately (or within a few seconds) reports the distraction information 260 to the driver.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/or orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as a HUD 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by the one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an objectoriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for improving driver attention awareness, the system comprising:
one or more processors; and
a memory communicably coupled to the one or more processors and storing:
a driver monitoring module including instructions that when executed by the one or more processors cause the one or more processors to monitor an attention status of a driver of a vehicle;
a distracted-driving module including instructions that when executed by the one or more processors cause the one or more processors to:

detect, based on the monitored attention status of the driver, a commencement of a distracted-driving incident;

record, during the distracted-driving incident, information pertaining to the distracted-driving incident, wherein the information includes a number of overlooked objects in one or more categories; and detect, based on the monitored attention status of the driver, an end of the distracted-driving incident; and a notification module including instructions that when executed by the one or more processors cause the one or more processors to report on an in-vehicle display device, at an earliest opportunity after the end of the distracted-driving incident and prior to a conclusion of a current trip, the information to the driver.

2. The system of claim 1, wherein the information includes one or more of a duration of the distracted-driving incident, a distance traveled by the vehicle during the distracted-driving incident, and an overlooked location-related context and the one or more categories include at least one of overlooked other road users, overlooked animals, overlooked traffic signals, overlooked traffic signs, and overlooked emergency vehicles.

3. The system of claim 2, wherein the overlooked other road users include one or more of vehicles, motorcyclists, bicyclists, pedestrians, and children.

4. The system of claim 2, wherein the overlooked location-related context includes one or more of a construction zone, a school zone, a school crossing, a crosswalk, an event venue, and a hospital zone.

5. The system of claim 1, wherein the notification module includes further instructions that when executed by the one or more processors cause the one or more processors to
communicate the information to the driver via an audible message and the in-vehicle display device is one of a head-up display and an instrument cluster.

6. The system of claim 1, wherein the earliest opportunity occurs immediately after the end of the distracted-driving incident.

7. The system of claim 1, wherein the notification module includes instructions that when executed by the one or more processors cause the one or more processors to detect a traffic situation and the earliest opportunity occurs immediately after the detected traffic situation has been resolved.

8. The system of claim 1, wherein the distracted-driving module includes instructions that when executed by the one or more processors cause the one or more processors to condition the commencement of the distracted-driving incident upon at least one of a distraction-duration threshold and a distance-traveled threshold being exceeded.

9. The system of claim 8, wherein the distracted-driving module includes further instructions that when executed by the one or more processors cause the one or more processors to:
estimate a level of risk associated with a current traffic situation; and
vary at least one of the distraction-duration threshold and the distance-traveled threshold depending on the estimated level of risk.

10. A non-transitory computer-readable medium for improving driver attention awareness and storing instructions that when executed by one or more processors cause the one or more processors to:
monitor an attention status of a driver of a vehicle;
detect, based on the monitored attention status of the driver, a commencement of a distracted-driving incident;

record, during the distracted-driving incident, information pertaining to the distracted-driving incident, wherein the information includes a number of overlooked objects in one or more categories;

detect, based on the monitored attention status of the driver, an end of the distracted-driving incident; and report on an in-vehicle display device, at an earliest opportunity after the end of the distracted-driving incident and prior to a conclusion of a current trip, the information to the driver.

11. The non-transitory computer-readable medium of claim 10, wherein the information includes one or more of a duration of the distracted-driving incident, a distance traveled by the vehicle during the distracted-driving incident, and an overlooked location-related context and the one or more categories include at least one of overlooked other road users, overlooked animals, overlooked traffic signals, overlooked traffic signs, and overlooked emergency vehicles.

12. A method of improving driver attention awareness, the method comprising:
monitoring an attention status of a driver of a vehicle;
detecting, based on the monitoring, a commencement of a distracted-driving incident;
recording, during the distracted-driving incident, information pertaining to the distracted-driving incident, wherein the information includes a number of overlooked objects in one or more categories;
detecting, based on the monitoring, an end of the distracted-driving incident; and
reporting on an in-vehicle display device, at an earliest opportunity after the end of the distracted-driving incident and prior to a conclusion of a current trip, the information to the driver.

13. The method of claim 12, wherein the information includes one or more of a duration of the distracted-driving incident, a distance traveled by the vehicle during the distracted-driving incident, and an overlooked location-related context and the one or more categories include at least one of overlooked other road users, overlooked animals, overlooked traffic signals, overlooked traffic signs, and overlooked emergency vehicles.

14. The method of claim 13, wherein the overlooked other road users include one or more of vehicles, motorcyclists, bicyclists, pedestrians, and children.

15. The method of claim 13, wherein the overlooked location-related context includes one or more of a construction zone, a school zone, a school crossing, a crosswalk, an event venue, and a hospital zone.

16. The method of claim 12, wherein the reporting includes
communicating the information to the driver via an audible message and the in-vehicle display device is one of a head-up display and an instrument cluster.

17. The method of claim 12, wherein the earliest opportunity occurs immediately after the end of the distracted-driving incident.

18. The method of claim 12, wherein the earliest opportunity occurs immediately after a detected traffic situation has been resolved.

19. The method of claim 12, wherein the commencement of the distracted-driving incident is conditioned upon at least one of a distraction-duration threshold and a distance-traveled threshold being exceeded.

20. The method of claim 19, further comprising estimating a level of risk associated with a current traffic situation, wherein at least one of the distraction-duration threshold and the distance-traveled threshold varies depending on the estimated level of risk.

\* \* \* \* \*